United States Patent [19]

Hindmon, Jr. et al.

[11] Patent Number: 5,440,891
[45] Date of Patent: Aug. 15, 1995

[54] FUZZY LOGIC BASED CONTROLLER FOR COOLING AND REFRIGERATING SYSTEMS

[76] Inventors: James O. Hindmon, Jr., 110 Old Hickory La., Powder Springs, Ga. 30073; Phillip G. Hindmon, Sr., 210 Maple Dr., Cedartown, Ga. 30125

[21] Appl. No.: 187,448

[22] Filed: Jan. 26, 1994

[51] Int. Cl.$^6$ ............................................. F25B 7/00
[52] U.S. Cl. ................................. 62/117; 62/175; 62/228.3; 236/78.0
[58] Field of Search .............. 62/175, 117, 229, 228.3, 62/213; 236/78 D

[56] References Cited

U.S. PATENT DOCUMENTS

| Re. 33,620 | 6/1991 | Persem | 62/215 |
|---|---|---|---|
| 4,081,691 | 3/1978 | Evalds et al. | 307/41 |
| 4,084,388 | 4/1978 | Nelson | 62/152 |
| 4,270,361 | 6/1981 | La Barge | 62/158 |
| 4,535,602 | 8/1985 | Alsenz et al. | 62/175 |
| 4,612,776 | 9/1986 | Alsenz | 62/175 |
| 4,628,700 | 12/1986 | Alsenz | 62/150 |
| 4,633,672 | 1/1987 | Persem et al. | 62/126 |
| 4,825,662 | 5/1989 | Alsenz | 62/175 X |
| 5,247,806 | 9/1993 | Ebisu et al. | 236/78 D X |

*Primary Examiner*—William E. Wayner
*Attorney, Agent, or Firm*—Jones & Askew

[57] ABSTRACT

A control system for controlling a plurality of compressors by means of fuzzy logic. Control is provided by selecting a combination of available compressors, which may include one or more fixed speed compressors and a variable speed compressor. The controller output signals are responsive to inputs monitoring either the pressures in the system's refrigerant suctions lines, the temperatures of the refrigerated spaces, or where a plurality of evaporators are connected to a set of compressors, the temperature of the coldest refrigerated case, or a combination of the desired suction pressure and temperature of the refrigerated space. The output capacity of the system is chosen based on the degree of membership of each input variable as compared to the total for all inputs.

33 Claims, 6 Drawing Sheets

*PRIOR ART*

FUZZY LOGIC BASED CONTROLLER FOR COOLING AND REFRIGERATING SYSTEMS

TECHNICAL FIELD

The present invention relates generally to controllers for commercial refrigeration systems, and more particularly is a fuzzy logic based controller that accurately and efficiently maintains the temperature and/or suction pressure of a refrigeration system.

BACKGROUND OF THE INVENTION

Commercial refrigeration systems are used to maintain a cooled space or a refrigerated product at a desired temperature. Refrigerated cases or rooms are commonly used by grocery stores, restaurants, warehouses, and food distributors. In order to maintain the quality of the refrigerated product while minimizing the cost of refrigeration, it is necessary to keep the temperature of the refrigerated product or case as close to the desired temperature as possible. If the temperature is allowed to rise, the quality or integrity of the product may be jeopardized. If the temperature is kept lower than necessary, energy is wasted and the already high cost of refrigerating the space is increased unnecessarily. For example, it is estimated that as much as 2% more energy is required for each degree the temperature runs below the desired temperature.

Several factors may be used to monitor and control the refrigerated space. These include suction pressure, head pressure, and the temperature of the air being discharged by the cooling system into the refrigerated area. If the desired product temperature is known, the required discharge air temperature can be determined. Alternatively, the suction pressure required in order to maintain a desired temperature may be determined by referring to a pressure-temperature chart for the particular refrigerant being used. The pressure-temperature chart provides the suction pressure that is required to be provided by the system in order to maintain the desired temperature.

The most common prior art refrigeration control systems attempt to maintain the desired temperature by monitoring and controlling the suction pressure of the compressors. Generally described, these systems define an acceptable pressure range by providing upper and lower pressure setpoints, referred to as cut-in and cut-out setpoints, respectively. When the suction pressure exceeds the cut-in setpoint, the system turns on additional compressors in order to increase the cooling capacity of the system. When the suction pressure falls below the cut-out setpoint, the systems turns off some of the compressors in order to decrease the cooling capacity of the system. As a result of using these upper and lower limits, the system includes a range or "dead band" in which the system is uncontrolled.

In order to restrict the number of compressors that are turned on or off at one time, the prior art systems establish certain predetermined combinations of compressors that are allowed. Thus, even if a system includes four or five compressors, a predetermined table is often set up in order to ensure that no more than two compressors change state at one time. These tables attempt to equalize the run time of the compressors and reduce inrush currents. Prior art systems also provide time delays in order to control the period of time between changes in compressor capacity. This reduces the wear and tear that results from starting and stopping the compressors more often than necessary. Thus, even if the suction pressure moves beyond the cut-in setpoint, the cooling capacity will not be increased until a predetermined time period has elapsed. Once this occurs, the controller will step to the next higher combination of compressors as provided in the table. Likewise, if the suction falls below the cut-out setpoint, the controller will step to the next lower combination of compressors only after the delay has elapsed. Thus, when a change in capacity is required, the amount of change is limited to the next step in the predefined table, and will be delayed until the preprogrammed delay time has elapsed.

Figure 1:
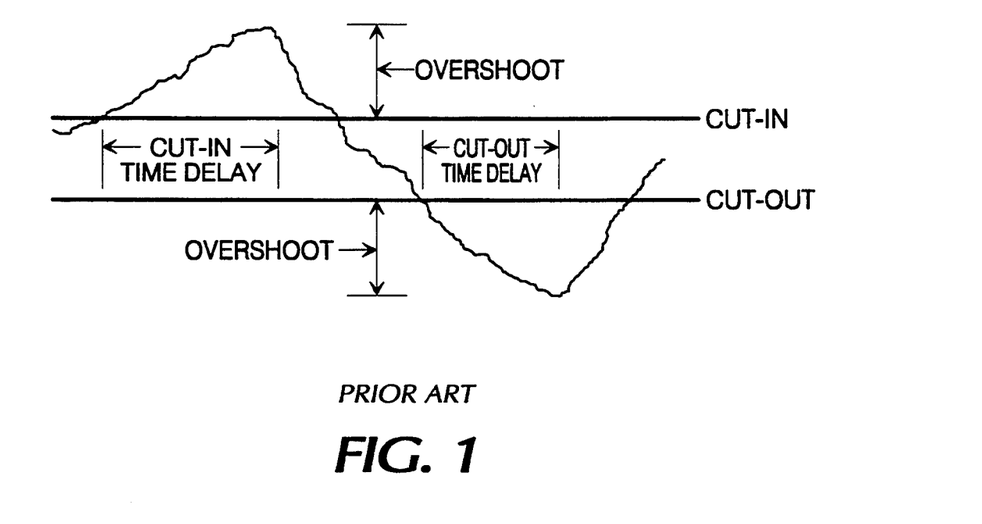
FIG. 1 is a graph illustrating typical suction pressure versus time characteristics of prior art systems.

FIG. 1 is a graph of the variations in suction pressure versus time for a prior art controller of the type described above. As can be seen, prior art controllers that use separate cut-in and cut-out setpoints have an inherent dead band problem. The system is not controlling the refrigeration system when the suction pressure is between the two setpoints. In fact, by including a time delay, the system is only controlled when the suction pressure has moved outside the setpoints for some period of time. This overshoot results in wide swings in suction pressure.

Limiting the number of compressors that can change energization state also forces the refrigeration system to go through extra steps in order to reach the necessary cooling capacity. For instance, consider a prior art controller and a refrigeration system that includes one 5 horsepower (hp) compressor and three 10 hp compressors. The predefined step table would typically allow the capacity to increase in the following steps: 5 hp, 10 hp, 15 hp, 20 hp, 25 hp, 30 hp, and 35 hp. If at system startup, the load required capacity of 35 hp, the prior art controller would go through each of the seven states with a delay in between successive states. If the delay was set to 90 seconds, it would take a minimum of 9 minutes for the controller to match the load. In addition, it would require 12 changes of energization state. Such a time delay in matching the capacity to the load wastes energy. The required changes in energization state increase the amount of wear and tear on the compressors.

As described above, the suction pressure required to maintain a desired temperature can be determined by referring to a pressure-temperature chart for a refrigerant. This is the only suction pressure that will maintain the desired product temperature in an ideal system. However, other factors such as evaporator superheat, refrigerant line sizing, and ambient temperature affect the relationship between the suction pressure and the temperature. As a result, one cannot depend on the calculated suction pressure value to be the optimum pressure. Prior art systems have attempted to address this problem by monitoring the temperature of the refrigerated space at predetermined intervals. If the refrigerated space is too cool, the cut-in and cut-out setpoints are increased by a predetermined incremental amount. Likewise, if the space is too warm, the setpoints are decreased by a predetermined incremental amount. This improved control over earlier systems. However, if the load changes quickly, such as when new products are added to the refrigerated space, the incremental adjustments to the setpoints could result in a large amount of time passing before the controller matched the capacity to the load.

Other prior refrigeration control systems have incorporated proportional-integral-derivative (PID) control algorithms. It is well known that such conventional linear controllers can be designed to achieve good results if the controlled process is stable and well-defined, and if the designer has a good mathematical model of the system. However, the refrigeration process is dynamic, non-linear, and unstable, and does not lend itself to accurate mathematical modeling. As such, it is very difficult to design and set up a satisfactory controller using conventional methods.

Therefore, there is a need in the art for a refrigeration system controller that overcomes the described disadvantages in spite of the dynamic, unstable, and non-linear nature of the refrigeration process. Such a system would be able to efficiently and accurately match the capacity of the system to the thermal load and thereby minimize the waste of energy and unnecessary wear on the system components.

SUMMARY OF THE INVENTION

The present invention satisfies the above described needs by providing a fuzzy logic based controller for controlling refrigeration systems. The controller measures input variables, such as case temperature, suction pressure, and the rate of change of temperature or pressure. These variables are mapped into degree-of-membership functions, and a set of fuzzy rules is applied. The output variables are used to provide output signals to control the system components.

By using fuzzy logic, the controller of the present invention is able to efficiently and accurately control a refrigeration system, which is dynamic, and is neither linear nor predictable. The controller is capable of using temperature as the primary control variable, thus eliminating the need to control the temperature indirectly by using suction pressure as the primary input. This approach is preferred because maintaining the desired temperature is the output that is ultimately desired from the system. The present invention is also capable of switching the cooling capacity of the system to precisely match the thermal load. This eliminates the delay and inefficiencies that occurs when the compressors must be switched through several intermediate states before reaching the desired cooling capacity.

The fuzzy logic controller provides the capability to vary the delay between energization state changes in response to the difference between the primary variable and the desired target, and the rate of change of the primary variable. In this manner, the controller may rapidly respond to drastic variations in the temperature or suction pressure. This also minimizes the number of energization state changes when the distance to the target variable is small, and the rate of change is small.

Accordingly, it is an object of the present invention to provide a controller that is capable of accurately and efficiently controlling a unstable, dynamic, non-linear system such as a refrigeration system.

It is another object of the present invention to provide a controller that controls a refrigeration system using temperature as the primary variable.

It is another object of the present invention to provide a controller that controls a refrigeration system using temperature as the primary variable and suction pressure as a secondary or alternative variable.

It is another object of the present invention to provide controller capable of directly matching the cooling capacity of the refrigeration system to the thermal load without requiring intermediate compressor energization states.

It is another object of the present invention to provide a controller that adjusts the delay between compressor energization states depending on the state of the system.

It is another object of the present invention to provide a robust control algorithm that selects the capacity required to match the load without stepping through a predefined capacity table.

It is another object of the present invention to provide a fuzzy logic refrigeration controller that saves energy by quickly matching the cooling capacity to the thermal load.

It is another object of the present invention to provide a fuzzy logic refrigeration controller that reduces the wear and tear on the compressors by minimizing the number of starts and stops.

It is another object of the present invention to provide an efficient, accurate refrigeration controller for use with refrigeration systems where an adequate system model is difficult or impossible to define.

It is another object of the present invention to provide an efficient, accurate refrigeration controller for use with refrigeration systems that have complex, continuous input and outputs and a non-linear response function.

These and other objects, features, and advantages of the present invention may be more clearly understood and appreciated from a review of the following detailed description of the preferred embodiments and by reference to the appended drawings and claims.

BRIEF DESCRIPTION OF THE DRAWINGS

FIG. 4, consisting of FIGS. 4a and 4b, provides graphs that illustrate the degree-of-membership functions for the temperature input and the rate of change of the temperature.

FIG. 5, consisting of FIGS. 5a and 5b, provides graphs that illustrate the degree-of-membership functions for the suction pressure input and the rate of change of the suction pressure.

DETAILED DESCRIPTION OF THE PREFERRED EMBODIMENT

Figure 2:
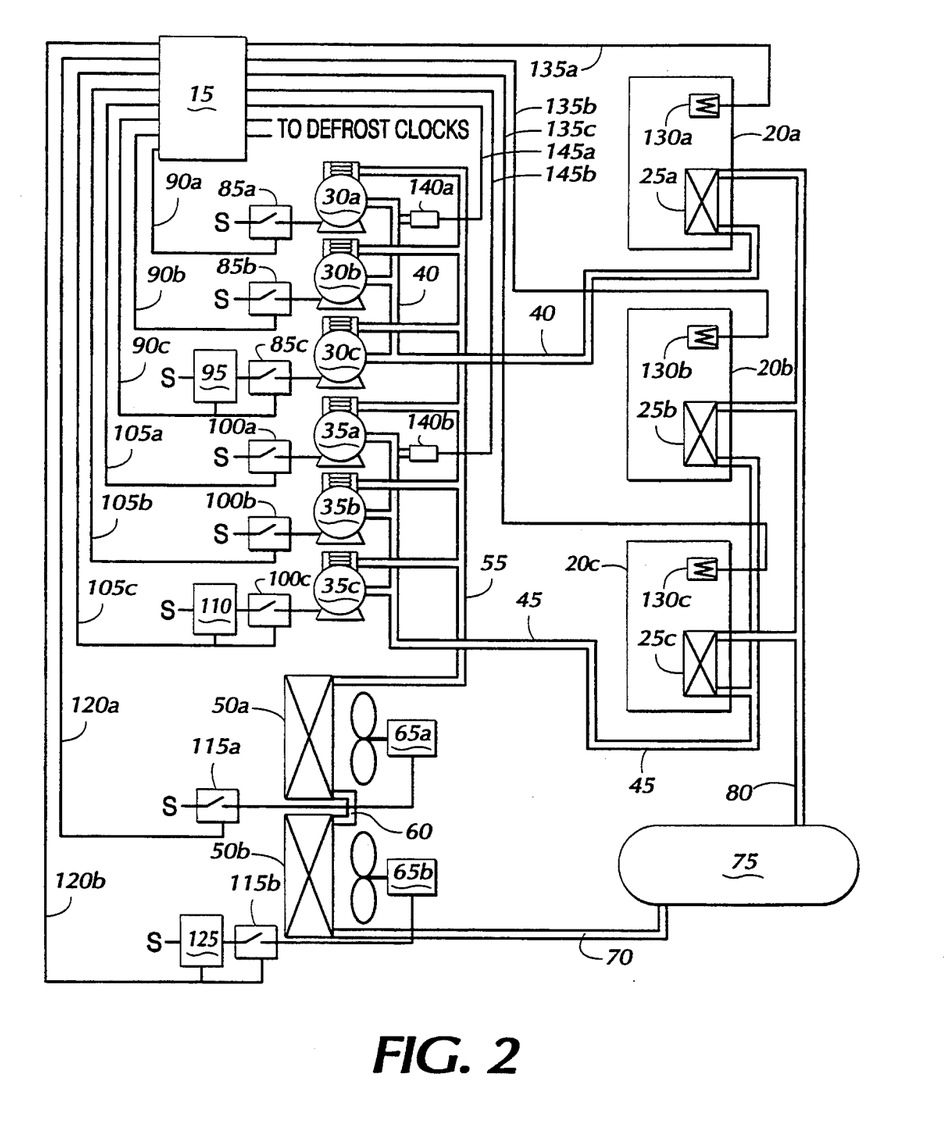
FIG. 2 is a schematic representation of a refrigeration system that incorporates the fuzzy logic based controller of the present invention.

Referring now to the drawings, in which like numerals represent like elements throughout the several figures, FIG. 2 illustrates a refrigeration system 10 that incorporates the fuzzy logic based controller 15 of the present invention.

The system of FIG. 2 is designed to maintain the desired temperatures in three refrigerated cases 20a, 20b, 20c. Each of the cases includes an evaporator 25a, 25b, 25c, which must be connected to one or more compressors. In the preferred system 10, the cases 20a, 20b, 20c are divided into two suction groups. Each suction group may operate at a different temperature and is connected to its own set of compressors. In this system, the case 20a forms a first suction group, which is driven by compressors 30a, 30b, 30c. The other cases 20b, 20c constitute a second suction group, which is driven by compressors 35a, 35b, 35c.

The evaporator 25a in the first suction group is connected to the compressors 30a, 30b, 30c by suction line 40. The evaporators 25b, 25c in the second suction group are connected to the compressors 35a, 35b, 35c by a separate suction line 45. As discussed above, this allows each suction group to be operated at different suction pressures, which results in different operating temperatures.

After the refrigerant is compressed by the compressors 30a, 30b, 30c, 35a, 35b, 35c, the refrigerant travels to condensers 50a, 50b via a common high pressure discharge line 55. The condensers 50a, 50b, which are connected to each other by pipe 60, are typically located on the roof of the building that houses the system, and include coils that allow the heat to be transferred from the refrigerant. The condensers 50a, 50b includes a fixed speed fan 65a and a variable speed fan 65b, which force ambient outside air across the condenser coils and facilitate the transfer of heat from the condenser coils.

After the refrigerant has passed through the condensers 50a, 50b, it travels via a discharge line drop leg 70 to a receiver 75, which acts as a reservoir for the refrigerant. From the receiver 75, the refrigerant travels to the evaporators 25a, 25b, 25c via pipe 80. Those skilled in the art will be familiar with the refrigeration cycle and the operation of these components.

In FIG. 2, the first suction group is driven by three parallel compressors, which include two fixed speed compressors 30a, 30b, and one variable speed compressor 30c. Similarly, the second suction group is driven by two fixed speed compressor 35a, 35b, and one variable speed compressor 35c. Those skilled in the art will appreciate that the number and size of the compressors associated with each suction group will depend on a plurality of factors, including the desired temperature, the size of the refrigerated space, the frequency with which the case is opened and closed, etc.

The compressors 30a, 30b, 30c, 35a, 35b, 35c and condenser fans 65a, 65b are powered by a 208 volt, three phase power source S. The three phase power is applied to the compressors and condenser fans via three phase relays or contactors. A low voltage control signal from the controller 15 to a contractor causes the contactor to apply the three phase power to the device by closing its contacts, or to remove power from the device by opening its contacts.

In the system of FIG. 2, power to the compressors 30a, 30b, 30c is controlled by contactors 85a, 85b, 85c, which receive control signals from the controller 15 via wires 90a, 90b, 90c. In order to adjust the speed of the variable speed compressor 30c the 208 volt three phase power is first passed through an inverter 95, which changes the frequency and chops the waveform in order to cause the compressor to run at the desired speed. The inverter is also controlled over signals provided on wire 90c.

Likewise, the compressors 35a, 35b, 35c are controlled by contactors 100a, 100b, 100c, which receive control signals from the controller 15 via wires 105a, 105b, 105c. An inverter 110 modifies the power provided to variable speed compressor 35c via contactor 100c. The inverter 110 is also controlled by signals provided on wire 105c.

The fixed speed condenser fan 65a receives power through a contactor 115a, which receives control signals from controller 15 via wire 120a. The variable speed condenser fan 65b receives power through inverter 125 and contactor 115b, both of which receive control signal from the controller 15 via wire 120b.

The refrigeration system 10 is controlled by the fuzzy logic based controller 15. In the preferred system, the controller 15 is microcontroller based and employs a combination of "C" and assembly language programming. In order to monitor the system, controller 15 receives input signals from various sensors. The temperature of each case 20a, 20b, 20c, is monitored by temperature sensors 130a, 130b, 130c, respectively. These signals are provided to the controller 15 via wires 135a, 135b, 135c. The suction pressure of each suction group is monitored by suction pressure sensors 140a, 140b, and the signals are provided to controller 15 via wires 145a, 145b. The controller 15 also receives input signals from defrost clocks, which determine when the cases 20a, 20b, 20c will be defrosted.

Figure 3:
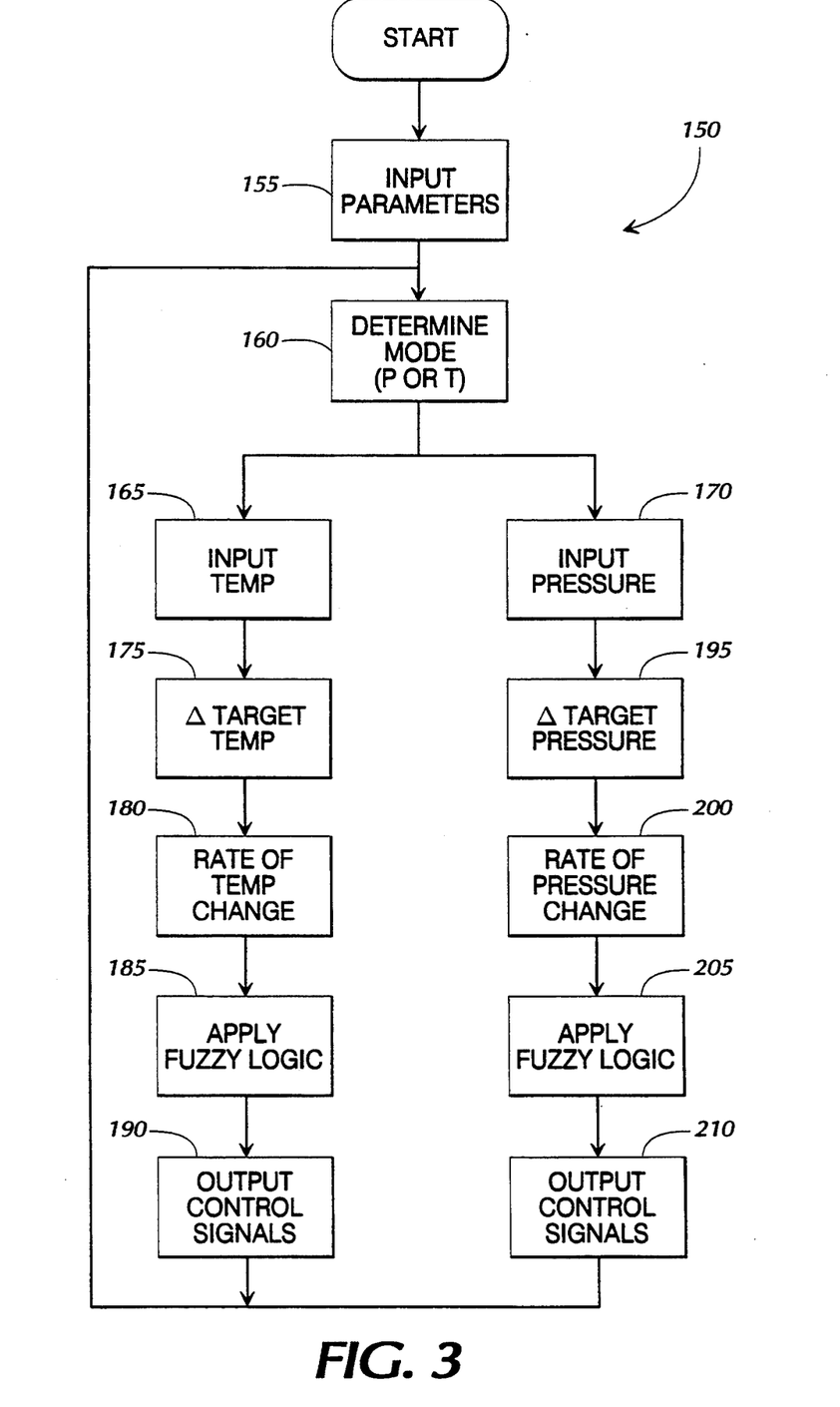
FIG. 3 is flow diagram illustrating the preferred method of operation of the system of FIG. 2.

FIG. 3 illustrates the preferred method 150 of operating the refrigeration system 10, which has been described above in conjunction with FIG. 2. The method begins at step 155 where the operating parameters are programmed into the system by the system manufacturer or end user. These parameters determine the operating mode and target parameters for each suction group in the system. The operating mode determines whether a suction group will be controlled to maintain a target temperature or a target suction pressure. The target parameters indicate the desired temperatures and/or suction pressures that are to be maintained. If a suction group has more than one case, the system may be set to maintain the temperature of the coldest case. These parameters may also include alarm temperatures that indicate the temperature has moved beyond certain limits.

The operating parameters also include the fuzzy logic algorithm that determines the control signals that are provided in response to the various input signals. The rules of the fuzzy logic algorithm are described more completely below. Although the operating mode and parameters must be set for each suction group, the following discussion will only consider the operation of the suction group that includes the case 20a.

After the operating parameters are entered, the method proceeds to step 160. At this step, the controller uses the operating parameters and input variables to determine whether the refrigeration system is to operate in the temperature or pressure mode. If the controller is programmed to operate in the temperature mode (i.e., to maintain a desired temperature), the method will advance to step 165. If the controller is programmed to operate in the pressure mode (i.e., to maintain a desired suction pressure), the method will advance to step 170.

The present inventor believes that the system will typically be programmed to use temperature as the primary variable. However, even if temperature is selected as the primary variable, the system temporarily switches to the pressure mode in the following circumstances. The controller will temporarily switch to the pressure mode when a suction group enters a defrost cycle. The system will attempt to maintain the suction pressure for a predetermined period of time before reverting to the pressure mode. The controller will also switch to the pressure mode if the system is unable to maintain the desired temperature for a suction group.

This typically occurs when the case temperature reaches or exceeds the alarm temperature programmed at step 155. The preferred system will switch to the pressure mode for a predetermined period of time, before attempting to return to the temperature mode. In the preferred system, this predetermined time is on the order of 15 minutes.

If the controller determines that it is to operate in the temperature mode, the method advances to step 165. At this step, the controller reads the temperature that is provided by the temperature sensor 130a. At step 175, the controller determines the difference between the target temperature and the temperature from the temperature sensor 130a. At step 180, the controller uses previous temperature measurements to determine the rate of change of the temperature. Once the case temperature, difference between target temperature and case temperature, and rate of temperature change are determined, the method 150 proceeds to step 185.

At step 185, the controller "fuzzifies" the input data and applies the fuzzy logic algorithm that was provided at step 155. The nature and operation of the fuzzy rules are described below in conjunction with FIGS. 4–7.

At step 190, the controller takes the output of the fuzzy rules, and defuzzifies them to provide control signals for the compressors 30a, 30b, 30c, and for the condenser fans 65a, 65b. Generally described, the control signals will increase the cooling capacity of the system when the temperature in case 20a is higher than the target temperature. This is accomplished by increasing the output of compressors 30a, 30b, 30c. The control signals will decrease the cooling capacity of the system when the temperature is below the target temperature by decreasing the output of compressors 30a, 30b, 30c. After the control signals are output at step 190, the method returns to step 160 and re-enters the control loop.

If at step 160, the controller determines that it is to operate in the pressure mode, the method advances to step 170. At this step, the controller reads the suction pressure that is provided by the suction pressure sensor 140a. At step 195, the controller determines the difference between the target suction pressure and the pressure from the sensor 140a. At step 200, the controller uses previous pressure measurements to determine the rate of change of the suction pressure. Once the suction pressure, difference between target pressure and suction pressure, and rate of pressure change are determined, the method 150 proceeds to step 205.

At step 205, the controller fuzzifies the input data and applies the fuzzy rules that were programmed at step 155. The nature and operation of the fuzzy rules are described below in conjunction with FIGS. 4–7.

At step 210, the controller takes the output of the fuzzy rules, and defuzzifies them to provide control signals for the compressors 30a, 30b, 30c, and for the condenser fans 65a, 65b. as described above, the control signals will increase the cooling capacity of the system when the suction pressure is higher than the target pressure. Likewise, the control signals will decrease the cooling capacity of the system when the pressure is below the target pressure. After the control signals are output at step 210, the method returns to step 160 and re-enters the control loop.

A fuzzy logic control algorithm allows a system's operational rules to be expressed in words using linguistically stated control criteria. Unlike classical set theory, which requires that an item either be part of a set or not, fuzzy logic allows partial set membership. This allows gradual transitions between being fully a member of a set and fully not being a member of a set. In this manner, fuzzy logic allows partial truth and partial falseness. This flexibility provides a controller that is much more robust in its control algorithm and that selects the required capacity to match the thermal load without stepping through a predefined capacity table.

In order to design the preferred fuzzy logic refrigeration controller, the system designer first identified the system input variables and their fuzzy ranges, and established degree-of-membership functions for each range. The next step was to identify the output variables and their fuzzy ranges, and establish degree-of-membership functions for these. The designer also provided rules that map the inputs to the outputs, and determined a method of combining the outputs of various fuzzy rules into a single, executable output to the system components.

Figure 5A:
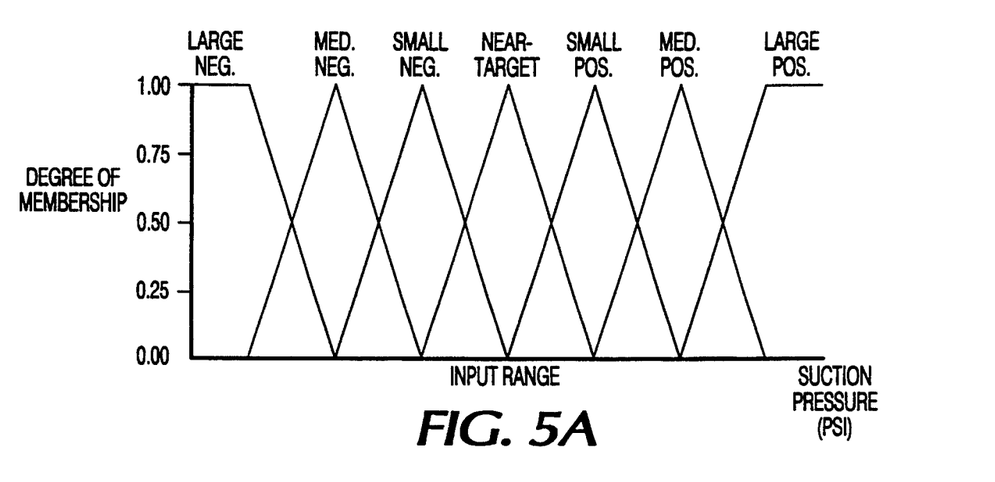
Figure 5B:
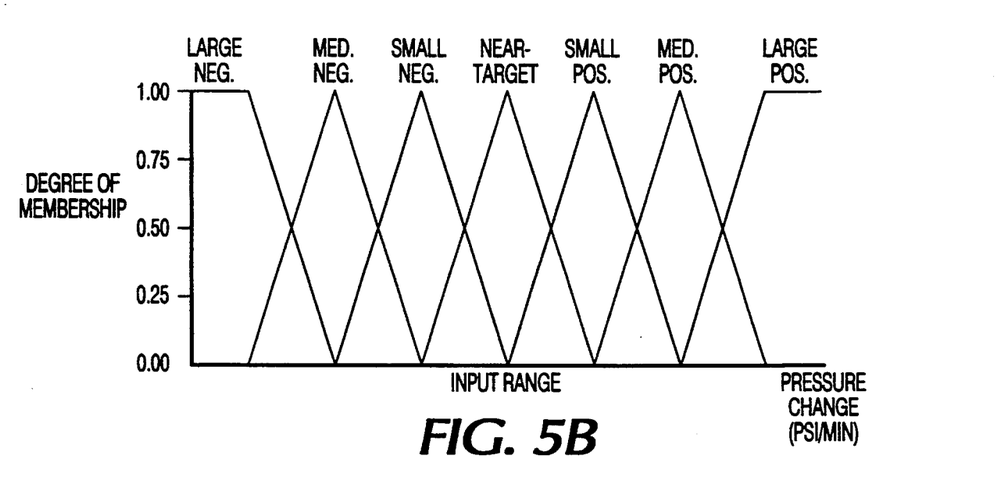
Figure 6:
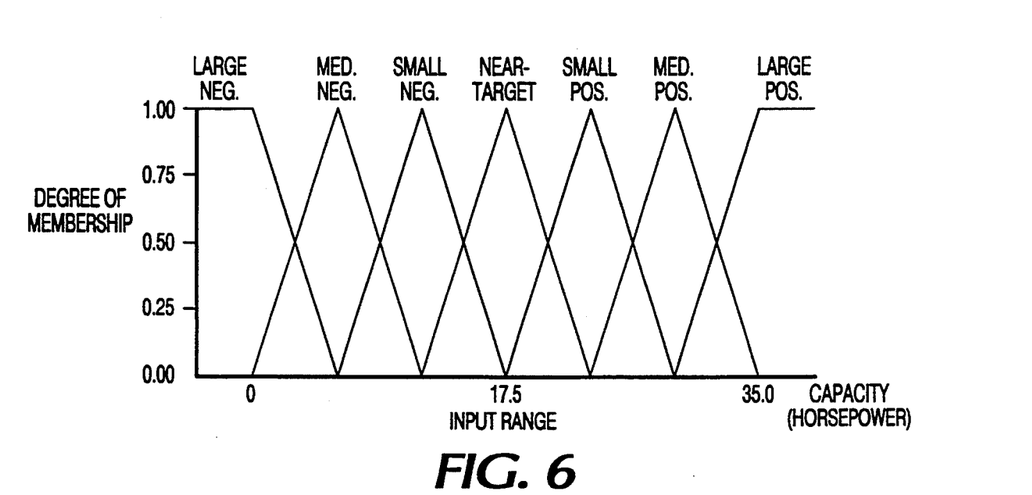
FIG. 6 is a graph illustrating the degree-of-membership function for the cooling capacity output.

In a fuzzy logic system, the degree-of-membership, or truth value, may range from 0 to 1. Degree of membership functions for the preferred refrigeration system are illustrated in FIGS. 4–6, and are discussed below. After the degree-of-membership is determined, the variables are combined using the logical operators AND, OR, and NOT. The output of the AND function is the lesser of the truth values of the two variables. The output of the OR function is the greater of the truth values of the two variables. The output of the NOT function is 1 minus the truth value of the specified variable.

Figure 4A:
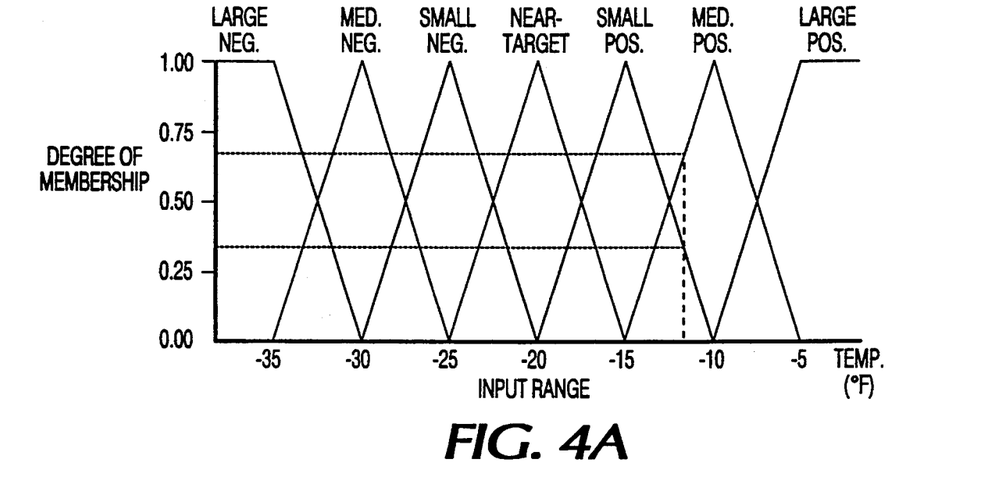

In refrigeration systems and other systems that are too complex to model accurately, fuzzy logic allows a control algorithm to be designed using imprecise terms. The degree of membership function allows the system to convert the input value to a fuzzy value. As illustrated in FIG. 4a, a temperature of $-12°$ F. would have a truth value of approximately 0.30 for the set MEDIUM POSITIVE and 0.70 for the set SMALL POSITIVE. Those skilled in the art will appreciate that the appropriate degree of membership for each temperature depends on a variety of factors, such as the target temperature, the sensitivity of the refrigerated product, etc. The process of converting the input variable into degree-of-membership values is commonly referred to as "fuzzifying."

The fuzzy variables are then subjected to the set of fuzzy rules that are part of the algorithm programmed into the controller. The general form for each rule is:

IF (CONDITION OR ANTECEDENT) THEN (ACTION OR CONSEQUENCE)

A rule is said to "fire" if the rule responds to the fuzzy input variables. An output is then determined according to the outputs of the logical rules. In many cases, more than one rule will fire, and it will be necessary to combine the actions indicated by the fuzzy output variables. The preferred system uses the centroid method of combining fuzzy output variables. The preferred controller also uses selected fuzzy output values as inputs, in order to form a feedback controller.

Figure 4B:
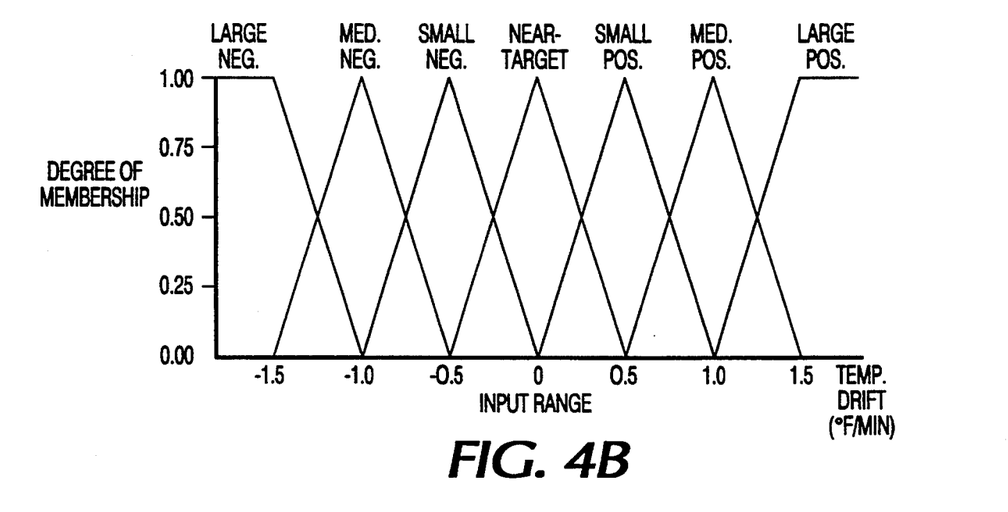
Figure 7:
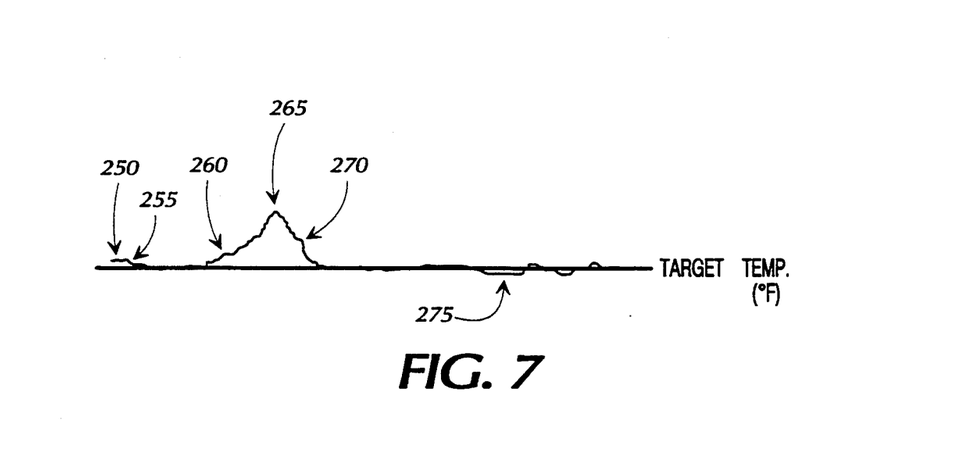
FIG. 7 is a graph illustrating the change in temperature versus time for the system of FIG. 2.

The present invention employs seven membership functions for each of the input and output variables. FIGS. 4a and 4b illustrate the degree-of-membership functions for temperature and rate of change of the temperature. FIGS. 5a and 5b illustrate the degree-of-membership functions for suction pressure and rate of change of the suction pressure. FIG. 7 illustrates the degree-of-membership function for the cooling capacity output variable. Each of the variables is mapped into a set of seven membership functions labeled LARGE_NEGATIVE, MEDIUM_NEGATIVE, SMALL_NEGATIVE, NEAR_TARGET, SMALL_POSITIVE, MEDIUM_POSITIVE, and LARGE_POSITIVE. Those skilled in the art will appreciate that the number of membership functions may vary from one system to another, or from one variable to another, depending on the range of the variables and the resolution that is desired.

The preferred system includes several hundred fuzzy rules. This set of rules is applied to their respective membership functions. An example of one rule used in the controller is:

IF (TEMP IS SMALL_POSITIVE AND RATE_OF_CHANGE IS SMALL_POSITIVE)THEN (CAPACITY IS SMALL_POSITIVE)

By applying each of the rules to the input variables and then defuzzifying the result, the controller provides a CAPACITY output variable between 0 and 100%. This represents the cooling capacity required for the current load.

For example, if a suction group has a total compressor capacity of 35 hp, and the output provides a CAPACITY value of 50%, the controller would select the compressor combination that gives the closest value to 17.5 hp. When selecting a combination of compressors, the controller will attempt to equalize the runtimes on the same size compressors. If a variable speed compressor is available, the controller will select the closest combination of fixed speed compressors that is less then the required load, and then adjust the speed of the variable speed compressor until the load is precisely matched.

The preferred system also uses fuzzy logic to implement an adjustable timing interval or time delay that is imposed between changes of capacity. By increasing the time delay where appropriate, the system reduces the number of starts and stops on each compressor, and decreases the wear on the system components. Likewise, the controller reduces the interval when a drastic change has occurred, thereby allowing the system to rapidly correct the problem and return the temperature or pressure to the predetermined limits. For example, if the error is very small in a positive direction and the controller variable is approaching the desired target, the time delay can be relatively large. However, if the error is very small in a positive direction and the rate of change of the controlled variable is very large, the time delay must be very short in order to take action to stop the movement of the controlled variable and return it to within a predetermined range of the target.

This is accomplished by establishing several rules for the time delay much in the same fashion as was done for the load. For instance, a rule selecting the proper time delay membership function is:

IF (ERROR IS LARGE_POSITIVE AND CAPACITY IS SMALL_POSITIVE) THEN (TIME_DELAY IS SMALL_POSITIVE)

The controller then uses the TIME_DELAY variable as an input, and thereby provides a feedback loop for the controller. By implementing an adjustable timing interval using fuzzy logic, the preferred system is able to make rapid adjustments to system capacity when the thermal load is large or changing quickly. The system is also able to reduce wear and tear on the system components by increase the time delay between energization states when the thermal load is small and is changing slowly. Those skilled in the art will appreciate that this is a significant improvement over the prior art, which implemented fixed delays and preset energization state changes regardless of the magnitude or rate of change of the thermal load.

Once the compressor combination to be used has been established and the time delay has elapsed, the controller will change the state of its output to match this combination. There is a small delay between each energization of a compressor and the energization of another in order to limit the inrush current being supplied by connected electrical switchgear.

If a variable speed compressor is available, the speed of the compressor will be varied to match the load. If the speed goes to maximum and remains there for a predetermined period of time, a new compressor capacity calculation will be performed. This calculation will find the capacity that is the minimum capacity closest to the load. The compressor speed will be reduced to minimum and the outputs will take on the state of a new compressor combination.

FIG. 7 illustrates the improved temperature versus time characteristic of the preferred refrigeration system as contrasted to the prior art characteristics shown in FIG. 1. The curve of FIG. 7 will be described in relation to demonstrative fuzzy logic rules similar to those that would be implemented in a refrigeration system. Those skilled in the art will appreciate that the particular input variables, output variables, membership functions and fuzzy rules will vary from one system to another depending on a variety of factors, including the size of the system, the nature of the products being refrigerated, the acceptable temperature variation, the amount of thermal input expected (e.g., how often the freezer door will be opened, or new goods will be added to the freezer). Likewise, those skilled in the art will understand that several rules may fire in response to an input condition, in which case the outputs would need to be combined in a manner known to those skilled in the art in order to provide the appropriate output signal to the compressors. However, the following discussion will assume that only one rule fires at a time. Therefore, the rules and responses discussed below are intended to be representative of an average refrigeration system using the fuzzy logic based controller of the present invention.

At the point 250, the temperature is somewhat high, and is fairly stable. Therefore, these inputs may cause the following rule to fire:

IF (ERROR IS MEDIUM_POSITIVE AND RATE IS NEAR_TARGET) THEN (CAPACITY IS MEDIUM_POSITIVE)

The output of this rule would cause the cooling capacity of the system to be increased to a medium value which, in the system described above, may be in the range of 23–35 horsepower. This additional cooling capacity would be expected to cause the temperature to drop.

At the point 255, the temperature has begun to decrease in response to the increased capacity. At this point, the temperature is a little bit high the rate of change is medium negative. There inputs may cause the following rule to fire:

IF (ERROR IS SMALL_POSITIVE AND RATE IS SMALL_NEGATIVE) THEN (CAPACITY IS SMALL_POSITIVE)

The output of this rule would decrease the capacity slightly in order to avoid or minimize overshoot as the temperature approaches the target. Thus, the capacity of the system would be decreased to approximately 17.5 to 29 horsepower, in order to slow the rate of change of the temperature.

At 260, the system has gone into defrost, and the temperature has begun to increase dramatically. At this point, the preferred controller will switch to the pressure mode and attempt to maintain the appropriate suction pressure.

At 265, the defrost cycle has ended and the temperature is very high, and usually well above the alarm limits programmed into the controller. This causes the preferred controller to continue to use pressure as its control variable. At this point, the pressure will also be very high, and will not be changing very much. These inputs may cause the following rule to fire:

IF (ERROR IS LARGE_POSITIVE AND RATE IS SMALL_NEGATIVE) THEN (CAPACITY IS LARGE_POSITIVE)

This fuzzy rule causes the capacity of the refrigeration system to be increased to its maximum amount in order to attempt to return the system to its normal operating parameters in the shortest amount of time.

With this large increase in capacity, the suction pressure will drop rapidly. The lag time of the temperature is much greater, and it will decrease more slowly. For this reason, the system continues to operate in the pressure mode for a predetermined period of time.

At 270, the controller is still using pressure as the primary variable. At this point the following rule will fire:

IF (ERROR IS LARGE_POSITIVE AND RATE IS LARGE_NEGATIVE) THEN (CAPACITY IS SMALL_POSITIVE)

This will cause the capacity to decrease, thereby decreasing the rate of the drop in pressure so that overshoot is minimal. After a predetermined time period has elapsed, the system returns to using temperature as the primary variable.

At step 275, the temperature has drifted to a point slight below the target, and is fairly stable. These conditions will cause the following rule to fire:

IF (ERROR IS SMALL_NEGATIVE AND RATE IS NEAR_TARGET)THEN(CAPACITY IS SMALL_NEGATIVE)

This rule causes the cooling capacity of the system to be decreased slightly, in order to allow the temperature in the case to rise slightly.

As can be seen from a comparison of FIG. 1 and FIG. 7, the fuzzy logic based refrigeration controller of the present invention provides a much better control algorithm for controlling both temperatures and pressures. Because the fuzzy logic based controller is constantly controlling the system, it virtually eliminates the dead band problem associated with the prior art systems. This allows the refrigeration system to run more consistently and minimizes the temperature and pressure swing, which improves the shelf life of the refrigerated products. The controller also reduces the number of cycles and wear and tear on the compressors.

From the foregoing description, it will be understood that the fuzzy logic refrigeration control system of the present invention provides a refrigeration control system that quickly and accurately matches the capacity of the refrigeration system to its thermal load without the inefficiencies resulting the preset capacity tables of the prior art. Likewise, the variable time delay allows the system to quickly respond to a thermal load that is large or rapidly changing, and to minimize energization state changes when the thermal load is small and changing slowly. This is accomplished by measuring the desired input variables, determining the degree-of-membership of the inputs in predetermined functions, applying fuzzy rules to provide the desired output variables, defuzzifying the output variables to provide output signals to the system components. By constantly monitoring the system, the controller is also able to adjust the capacity of the system as the temperature or pressure approaches the target, which either eliminates or substantially reduces the amount of overshoot that occurs.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A refrigeration system control device using fuzzy logic for controlling a plurality of refrigeration compressors such that the closest capacity is selected to match the load to each of a plurality of evaporators comprising:

a control having an input adapted to be connected to a means to sense the temperature in the controlled space wherein a control signal is indicative of the maximum refrigeration load of the controlled space;

a means for determining whether the primary control variable in said space is above or below a single predetermined desired target;

a pressure sensing means connected to the refrigeration system in a manner which allows generating a signal responsive to the suction pressure of the refrigeration system;

a means for generating a signal indicative that the temperature in said space is above a predetermined high alarm setpoint or below a low alarm setpoint, said signal causing disconnect of said temperature control signal from the control device and allowing the control to use a signal from the pressure sensing means as the control signal;

a signal means to indicate that said controlled space is in defrost, such means causing disconnect of said temperature control signal from the control device and allowing the control to use a signal from the pressure sensing means as the control signal;

a timer having an adjustable timing interval based upon the error in the control signal of the device and the single predetermined desired target for that control signal and the rate of change of the control signal;

a selection means consisting of fuzzy logic rules and membership functions for determining, after said timer interval has elapsed, the closest combination of available compressors which will match the load;

an output being an electric signal adapted to selectively energize or de-energize said combination of the plurality of refrigeration compressors.

2. A method for controlling a refrigeration system, said refrigeration system comprising a controller for implementing a control algorithm, a cooled space, an evaporator associated with said cooled space, and a plurality of compressors operatively connected to said evaporator, comprising the steps of:

measuring the temperature of said cooled space and providing a corresponding measured temperature signal to said controller;

measuring the suction pressure of said compressors and providing a corresponding measured suction pressure signal to said controller;

defining a first operating mode in which said controller attempts to maintain a target temperature in said cooled space by varying the cooling capacity of said compressors;

defining a second operating mode in which said controller attempts to maintain a target suction pressure by varying the cooling capacity of said compressors;

selecting said first operating mode or said second operating mode;

determining a desired capacity of said compressors by applying said control algorithm to said measured temperature signal and said measured suction pressure signal; and providing output signals for operating said compressors at said desired capacity, wherein applying said control algorithm comprises the steps of determining a first degree of membership for said measured temperature signal, determining a second degree of membership for said measured suction pressure signal, applying a plurality of operational rules to said first and second degrees of membership, and combining the output of said operational rules in a predetermined manner to obtain said output signals.

3. A method for controlling a refrigeration system as recited in claim 2, wherein said compressors comprise a plurality of fixed speed compressors, and wherein said output signals are operative for energizing a combination of said fixed speed compressors.

4. A method for controlling a refrigeration system as recited in claim 3, wherein said combination of said fixed speed compressors comprises the minimum closest capacity required to match the thermal load on said refrigeration system.

5. A method for controlling a refrigeration system as recited in claim 2, wherein said compressors comprise at least one fixed speed compressor and a variable speed compressor, and said output signals are operative for energizing and de-energizing said at least one fixed speed compressor, and for varying the speed of said variable speed compressor.

6. A method for controlling a refrigeration system, said refrigeration system comprising a controller for implementing a control algorithm, a cooled space, an evaporator associated with said cooled space, and a plurality of compressors operatively connected to said evaporator, comprising the steps of:

measuring the temperature of said cooled space and providing a corresponding measured temperature signal to said controller;

measuring the suction pressure of said compressors and providing a corresponding measured suction pressure signal to said controller;

defining a first operating mode in which said controller attempts to maintain a target temperature in said cooled space by varying the cooling capacity of said compressors;

defining a second operating mode in which said controller attempts to maintain a target suction pressure by varying the cooling capacity of said compressors;

determining if said cooled space is in a defrost mode;

selecting said second operating mode if said cooled space is in said defrost mode;

determining a desired capacity of said compressors by applying said control algorithm to said measured temperature signal and said measured suction pressure signal; and providing output signals for operating said compressors at said desired capacity.

7. A method for controlling a refrigeration system as recited in claim 6, further comprising the steps of:

determining when said defrost mode is terminated; and continuing to operate in said second operating mode until a predetermined period of time subsequent to the termination of said defrost mode has elapsed.

8. A method for controlling a refrigeration system as recited in claim 7, further comprising the step of selecting said fist operating mode after said predetermined period of time has elapsed.

9. A method for controlling a refrigeration system, said refrigeration system comprising a controller for implementing a control algorithm, a cooled space, an evaporator associated with said cooled space, and a plurality of compressors operatively connected to said evaporator, comprising the steps of:

measuring the temperature of said cooled space and providing a corresponding measured temperature signal to said controller;

measuring the suction pressure of said compressors and providing a corresponding measured suction pressure signal to said controller;

defining a first operating mode in which said controller attempts to maintain a target temperature in said cooled space by varying the cooling capacity of said compressors;

defining a second operating mode in which said controller attempts to maintain a target suction pressure by varying the cooling capacity of said compressors;

establishing an upper temperature boundary and a lower temperature boundary;

determining if said measured temperature signal is within a range defined by said upper and lower temperature boundaries;

selecting said first operating mode if said measured temperature signal is within said range;

selecting said second operating mode if said measured temperature signal is not within said range;

determining a desired capacity of said compressors by applying said control algorithm to said measured temperature signal and said measured suction pressure signal; and providing output signals for operating said compressors at said desired capacity.

10. A method for controlling a refrigeration system as recited in claim 9, further comprising the steps of:

continuing to operate in said second operating mode until a predetermined period of time has elapsed; and determining, at the end of said predetermined time period, whether said measured temperature signal is within said range.

11. A method for controlling a refrigeration system as recited in claim 10, further comprising the step of selecting said first operating mode if said measured temperature signal is within said range.

12. A method for controlling a refrigeration system, said refrigeration system comprising a controller for implementing a control algorithm, a cooled space, an evaporator associated with said cooled space, and a plurality of compressors operatively connected to said evaporator, comprising the steps of:
measuring the temperature of said cooled space and providing a corresponding measured temperature signal to said controller;
measuring the suction pressure of said compressors and providing a corresponding measured suction pressure signal to said controller;
defining a first operating mode in which said controller attempts to maintain a target temperature in said cooled space by varying the cooling capacity of said compressors;
defining a second operating mode in which said controller attempts to maintain a target suction pressure by varying the cooling capacity of said compressors;
selecting said first operating mode or said second operating mode;
determining a rate of change of said temperature and providing a rate of change signal to said controller;
determining a desired capacity of said compressors by applying said control algorithm to said measured temperature signal, said measured suction pressure signal, and said rate of change signal; and
providing output signals for operating said compressors at said desired capacity.

13. A method for controlling a refrigeration system as recited in claim 12, further comprising the step of determining an adjustable timing interval based on said rate of change signal and the difference between said measured temperature and said target temperature, and wherein said desired capacity is determined subsequent to the expiration of said timing interval.

14. A method for controlling a refrigeration system, said refrigeration system comprising a controller for implementing a control algorithm, a cooled space, an evaporator associated with said cooled space, and a plurality of compressors operatively connected to said evaporator, comprising the steps of:
measuring the temperature of said cooled space and providing a corresponding measured temperature signal to said controller;
measuring the suction pressure of said compressors and providing a corresponding measured suction pressure signal to said controller;
defining a first operating mode in which said controller attempts to maintain a target temperature in said cooled space by varying the cooling capacity of said compressors;
defining a second operating mode in which said controller attempts to maintain a target suction pressure by varying the cooling capacity of said compressors;
selecting said first operating mode or said second operating mode;
determining a rate of change of said suction pressure and providing a rate of change signal to said controller;
determining a desired capacity of said compressors by applying said control algorithm to said measured temperature signal, said measured suction pressure signal, and said rate of change signal; and
providing output signals for operating said compressors at said desired capacity.

15. A method for controlling a refrigeration system as recited in claim 14, further comprising the step of determining an adjustable timing interval based on said rate of change signal and the difference between said measured suction pressure and said target suction pressure, and wherein said desired capacity is determined subsequent to the expiration of said timing interval.

16. A refrigeration system controller for controlling a refrigeration system, said refrigeration system comprising a cooled space, an evaporator associated with said cooled space, and a plurality of compressors operatively connected to said evaporator, comprising:
a temperature sensor for measuring the temperature of said cooled space and for providing a corresponding measured temperature signal to said controller;
a suction pressure sensor for measuring the suction pressure of said compressors and for providing a corresponding measured suction pressure signal to said controller; and
a control unit operative for
defining a first operating mode in which said controller attempts to maintain a target temperature in said cooled space by varying the cooling capacity of said compressors;
defining a second operating mode in which said controller attempts to maintain a target suction pressure by varying the cooling capacity of said compressors;
selecting said first operating mode or said second operating mode;
determining a desired capacity of said compressors by applying a control algorithm to said measured temperature signal and said measured suction pressure signal; and
providing output signals for operating said compressors at said desired capacity,
wherein said control algorithm comprises the steps of determining a first degree of membership for said measured temperature signal, determining a second degree of membership for said measured suction pressure signal, applying a plurality of operational rules to said first and second degrees of membership, and combining the output of said operational rules in a predetermined manner to obtain said output signals.

17. A refrigeration system controller as recited in claim 16, wherein said compressors comprise a plurality of fixed speed compressors, and wherein said output signals are operative for energizing a combination of said fixed speed compressors.

18. A refrigeration system controller as recited in claim 17, wherein said combination of said fixed speed compressors comprises the minimum closest capacity required to match the thermal load on said refrigeration system.

19. A refrigeration system controller as recited in claim 16, wherein said compressors comprise at least one fixed speed compressor and a variable speed compressor, and said output signals are operative for energizing or de-energizing said at least one fixed speed compressor, and for varying the speed of said variable speed compressor.

20. A refrigeration system controller for controlling a refrigeration system, said refrigeration system comprising a cooled space, an evaporator associated with said cooled space, and a plurality of compressors operatively connected to said evaporator, comprising:
- a temperature sensor for measuring the temperature of said cooled space and for providing a corresponding measured temperature signal to said controller;
- a suction pressure sensor for measuring the suction pressure of said compressors and for providing a corresponding measured suction pressure signal to said controller; and
- a control unit operative for
  - defining a first operating mode in which said controller attempts to maintain a target temperature in said cooled space by varying the cooling capacity of said compressors;
  - defining a second operating mode in which said controller attempts to maintain a target suction pressure by varying the cooling capacity of said compressors;
  - determining if said cooled space is in a defrost mode;
  - selecting said second operating mode if said cooled space is in said defrost mode
  - determining a desired capacity of said compressors by applying a control algorithm to said measured temperature signal and said measured suction pressure signal; and
  - providing output signals for operating said compressors at said desired capacity.

21. A refrigeration system controller as recited in claim 20, wherein selecting said first or second operating mode further comprises the steps of:
- determining when said defrost mode is terminated;
- continuing to operate in said second operating mode until a predetermined period of time subsequent to the termination of said defrost mode has elapsed; and
- selecting said fist operating mode after said predetermined period of time has elapsed.

22. A refrigeration system controller for controlling a refrigeration system, said refrigeration system comprising a cooled space, an evaporator associated with said cooled space, and a plurality of compressors operatively connected to said evaporator, comprising:
- a temperature sensor for measuring the temperature of said cooled space and for providing a corresponding measured temperature signal to said controller;
- a suction pressure sensor for measuring the suction pressure of said compressors and for providing a corresponding measured suction pressure signal to said controller; and
- a control unit operative for
  - defining a first operating mode in which said controller attempts to maintain a target temperature in said cooled space by varying the cooling capacity of said compressors;
  - defining a second operating mode in which said controller attempts to maintain a target suction pressure by varying the cooling capacity of said compressors;
  - establishing an upper temperature boundary and a lower temperature boundary;
  - determining if said measured temperature signal is within a range defined by said upper and lower temperature boundaries;
  - selecting said first operating mode if said measured temperature signal is within said range; and
  - selecting said second operating mode if said measured temperature signal is not within said range.
  - determining a desired capacity of said compressors by applying a control algorithm to said measured temperature signal and said measured suction pressure signal; and
  - providing output signals for operating said compressors at said desired capacity.

23. A refrigeration system controller as recited in claim 22, wherein selecting said first or second operative mode further comprises the steps of:
- continuing to operate in said second operating mode until a predetermined period of time has elapsed;
- determining, at the end of said predetermined time period, whether said measured temperature signal is within said range; and
- selecting said first operating mode if said measured temperature signal is within said range.

24. A refrigeration system controller for controlling a refrigeration system, said refrigeration system comprising a cooled space, an evaporator associated with said cooled space, and a plurality of compressors operatively connected to said evaporator, comprising:
- a temperature sensor for measuring the temperature of said cooled space and for providing a corresponding measured temperature signal to said controller;
- a suction pressure sensor for measuring the suction pressure of said compressors and for providing a corresponding measured suction pressure signal to said controller; and
- a control unit operative for
  - defining a first operating mode in which said controller attempts to maintain a target temperature in said cooled space by varying the cooling capacity of said compressors;
  - defining a second operating mode in which said controller attempts to maintain a target suction pressure by varying the cooling capacity of said compressors;
  - selecting said first operating mode or said second operating mode;
  - determining a rate of change of said temperature and providing a rate of change signal to said controller;
  - determining a desired capacity of said compressors by applying a control algorithm to said measured temperature signal, said measured suction pressure signal, and said rate of change signal; and
  - providing output signals for operating said compressors at said desired capacity.

25. A refrigeration system controller as recited in claim 24, wherein said control unit is further operative for determining an adjustable timing interval based on said rate of change signal and the difference between said measured temperature and said target temperature, and wherein said desired capacity is determined subsequent to the expiration of said timing interval.

26. A refrigeration system controller for controlling a refrigeration system, said refrigeration system comprising a cooled space, an evaporator associated with said cooled space, and a plurality of compressors operatively connected to said evaporator, comprising:
- a temperature sensor for measuring the temperature of said cooled space and for providing a corresponding measured temperature signal to said controller;

a suction pressure sensor for measuring the suction pressure of said compressors and for providing a corresponding measured suction pressure signal to said controller; and a control unit operative for
defining a first operating mode in which said controller attempts to maintain a target temperature in said cooled space by varying the cooling capacity of said compressors;
defining a second operating mode in which said controller attempts to maintain a target suction pressure by varying the cooling capacity of said compressors;
selecting said first operating mode or said second operating mode;
determining a rate of change of said suction pressure and providing a rate of change signal to said controller;
determining a desired capacity of said compressors by applying a control algorithm to said measured temperature signal, said measured suction pressure signal, and said rate of change signal; and
providing output signals for operating said compressors at said desired capacity.

27. A refrigeration system controller as recited in claim 26, wherein said control unit is further operative for determining an adjustable timing interval based on said rate of change signal and the difference between said measured suction pressure and said target suction pressure, and wherein said desired capacity is determined subsequent to the expiration of said timing interval.

28. A method for controlling a refrigeration system, said refrigeration system comprising a controller for implementing a control algorithm, a cooled space, an evaporator associated with said cooled space, and a plurality of compressors operatively connected to said evaporator, comprising the steps of:
measuring the temperature of said cooled space and providing a corresponding measured temperature signal to said controller;
measuring the suction pressure of said compressors and providing a corresponding measured suction pressure signal to said controller;
defining a first operating mode in which said controller attempts to maintain a target temperature in said cooled space by varying the cooling capacity of said compressors;
defining a second operating mode in which said controller attempts to maintain a target suction pressure by varying the cooling capacity of said compressors;
determining if said cooled space is in a defrost mode;
selecting said first operating mode if said cooled space is in said defrost mode;
determining a desired capacity of said compressors by applying said control algorithm to said measured temperature signal and said measured suction pressure signal; and
providing output signals for operating said compressors at said desired capacity.

29. A method for controlling a refrigeration system, said refrigeration system comprising a controller for implementing a control algorithm, a cooled space, an evaporator associated with said cooled space, and a plurality of compressors operatively connected to said evaporator, comprising the steps of:
measuring the temperature of said cooled space and providing a corresponding measured temperature signal to said controller;
measuring the suction pressure of said compressors and providing a corresponding measured suction pressure signal to said controller;
defining a first operating mode in which said controller attempts to maintain a target temperature in said cooled space by varying the cooling capacity of said compressors;
defining a second operating mode in which said controller attempts to maintain a target suction pressure by varying the cooling capacity of said compressors;
selecting said first operating mode or said second operating mode;
providing a temperature error by determining the difference between said measured temperature signal and said target temperature;
determining a desired capacity of said compressors by applying said control algorithm to said measured temperature signal and said measured suction pressure signal, wherein the relationship between said desired capacity and said temperature error is non-linear; and
providing output signals for operating said compressors at said desired capacity.

30. A method for controlling a refrigeration system, said refrigeration system comprising a controller for implementing a control algorithm, a cooled space, an evaporator associated with said cooled space, and a plurality of compressors operatively connected to said evaporator, comprising the steps of:
measuring the temperature of said cooled space and providing a corresponding measured temperature signal to said controller;
measuring the suction pressure of said compressors and providing a corresponding measured suction pressure signal to said controller;
defining a first operating mode in which said controller attempts to maintain a target temperature in said cooled space by varying the cooling capacity of said compressors;
defining a second operating mode in which said controller attempts to maintain a target suction pressure by varying the cooling capacity of said compressors;
selecting said first operating mode or said second operating mode;
providing a suction pressure error by determining the difference between said measured suction pressure signal and said target suction pressure;
determining a desired capacity of said compressors by applying said control algorithm to said measured temperature signal and said measured suction pressure signal, wherein the relationship between said desired capacity and said suction pressure error is non-linear; and
providing output signals for operating said compressors at said desired capacity.

31. A refrigeration system control device using fuzzy logic for controlling a plurality of refrigeration compressors such that the closest capacity is selected to match the load to each of a plurality of evaporators comprising:
a control having an input adapted to be connected to a pressure sensing means to sense the suction pressure in a refrigeration system wherein a control signal is indicative of the refrigeration load of the controlled space;

a pressure sensing means connected to the refrigeration system in a manner which allows generating a signal responsive to the suction pressure of the refrigeration system;

a means for determining whether the suction pressure in said refrigeration system is above or below a single predetermined desired target;

a timer having an adjustable timing interval based upon the error in the said control signal of the device and the single predetermined desired target for that control signal and the rate of change of the control signal;

a selection means consisting of fuzzy logic rules and membership functions for determining, after said timer interval has elapsed, the closest combination of available compressors which will match the load;

an output being an electric signal adapted to selectively energize or deenergize said combination of the plurality of refrigeration compressors.

32. A refrigeration system control device using fuzzy logic for controlling a plurality of refrigeration compressors and one or more variable speed compressors such that the minimum closest capacity is selected to match the load to each of a plurality of evaporators comprising and an output means to vary the speed of the variable speed compressor until the load is precisely matched:

a control having an input adapted to be connected to a means to sense the temperature in the controlled space wherein a control signal is indicative of the maximum refrigeration load of the controlled space;

a means for determining whether the primary control variable in said space is above or below a single predetermined desired target;

a pressure sensing means connected to the refrigeration system in a manner which allows generating a signal responsive to the suction pressure of the refrigeration system;

a means for generating a signal indicative that the temperature in said space is above a predetermined high alarm setpoint or below a low alarm setpoint, said signal causing disconnect of said temperature control signal from the control device and allowing the control to use a signal from the pressure sensing means as the control signal;

a signal means to indicate that said controlled space is in defrost, such means causing disconnect of said temperature control signal from the control device and allowing the control to use a signal from the pressure sensing means as the control signal;

a timer having an adjustable timing interval based upon the error in the control signal of the device and the single predetermined desired target for that control signal and the rate of change of the control signal;

a selection means consisting of fuzzy logic rules and membership functions for determining, after said timer interval has elapsed, the minimum capacity combination of available compressors which will match the load;

a means for generating a signal indicative of the required speed of said variable speed compressor;

an output being an electric signal adapted to selectively energize or deenergize said combination of the plurality of refrigeration compressors;

an output being an electric signal adapted to control the speed through an external means of said variable speed compressor.

33. A refrigeration system control device using fuzzy logic for controlling a plurality of refrigeration compressors and one or more variable speed compressors such that the minimum closest capacity is selected to match the load to each of a plurality of evaporators comprising and an output means to vary the speed of the variable speed compressor until the load is precisely matched:

a control having an input adapted to be connected to a pressure sensing means to sense the suction pressure in a refrigeration system wherein a control signal is indicative of the refrigeration load of the controlled space;

a pressure sensing means connected to the refrigeration system in a manner which allows generating a signal responsive to the suction pressure of the refrigeration system;

a means for determining whether the suction pressure in said refrigeration system is above or below a single predetermined desired target;

a timer having an adjustable timing interval based upon the error in the said control signal of the device and the single predetermined desired target for that control signal and the rate of change of the control signal;

a timer having an adjustable timing interval based upon the error in the control signal of the device and the single predetermined desired target for that control signal and the rate of change of the control signal;

a selection means consisting of fuzzy logic rules and membership functions for determining, after said timer interval has elapsed, the minimum capacity combination of available compressors which will match the load;

a means for generating a signal indicative of the required speed of said variable speed compressor;

an output being an electric signal adapted to selectively energize or deenergize said combination of the plurality of refrigeration compressors;

an output being an electric signal adapted to control the speed through an external means of said variable speed compressor.

* * * * *